US012634139B2

(12) United States Patent
Pun et al.

(10) Patent No.: US 12,634,139 B2
(45) Date of Patent: May 19, 2026

(54) BLOCKCHAIN-BASED TRACEABILITY SYSTEM AND METHOD

(71) Applicant: Logistics and Supply Chain MultiTech R&D Centre Limited, Hong Kong (HK)

(72) Inventors: Tsz Ho Pun, Hong Kong (HK); Chung Dak Shum, Hong Kong (HK)

(73) Assignee: Logistics And Supply Chain/MultiTecch R&D Centre Ltd, Hong Kong (HK)

( * ) Notice: Subject to any disclaimer, the term of this patent is extended or adjusted under 35 U.S.C. 154(b) by 518 days.

(21) Appl. No.: 18/192,860

(22) Filed: Mar. 30, 2023

(65) Prior Publication Data

US 2024/0333509 A1     Oct. 3, 2024

(51) Int. Cl.
H04L 9/32        (2006.01)
G06Q 10/08        (2024.01)
(Continued)

(52) U.S. Cl.
CPC ............ H04L 9/3218 (2013.01); G06Q 10/08 (2013.01); H04L 9/0618 (2013.01); H04L 9/0866 (2013.01); H04L 9/50 (2022.05)

(58) Field of Classification Search
CPC ....... H04L 9/50; H04L 9/3218; H04L 9/0643; H04L 67/104; H04L 9/3221; G06Q 20/389; G06Q 20/401; G06F 21/64; G06F 16/27
See application file for complete search history.

(56) References Cited

U.S. PATENT DOCUMENTS 9,785,369 B1 *  10/2017  Ateniese ............... G06F 3/0659
2018/0130034 A1 *  5/2018  Taylor .............. G06Q 20/38215
(Continued)

FOREIGN PATENT DOCUMENTS

CN        112839046 A        5/2021
CN        114629687 A        6/2022
(Continued)

OTHER PUBLICATIONS

Maouchi et al, "DECOUPLES: a decentralized, unlinkable and privacy-preserving traceability system for the supply chain", SAC '19: Proceedings of the 34th ACM/SIGAPP Symposium on Applied Computing Apr. 2019, Apr. 8, 2019, pp. 364-373, Publisher: ACM Digital Library.
(Continued)

*Primary Examiner* — Tae K Kim
(74) *Attorney, Agent, or Firm* — GableGotwals

(57)            ABSTRACT
Provided is a computer implemented method of providing a blockchain based traceability service. The method comprises, for each secret from a set of secrets associated with respective ones of a set of parameters for a traceable item, generating a proof to provide a set of proofs. The method includes generating a ciphertext based on a public data encryption key from a set of public data encryption keys associated with said parameters for the traceable item, and information of said traceable item. The preceding step is repeated for each pair of identifier and public data encryption key. The method involves uploading to the blockchain the generated ciphertext, the respective identifier, a hash value of the respective secret, and the respective proof for each parameter of the traceable item, verifying in the blockchain the set of uploaded proofs, and storing verified data in the blockchain.

12 Claims, 4 Drawing Sheets

(51) Int. Cl.
    *H04L 9/00*           (2022.01)
    *H04L 9/06*           (2006.01)
    *H04L 9/08*           (2006.01)

(56)            References Cited

U.S. PATENT DOCUMENTS

| | | | |
|---|---|---|---|
| 2019/0384895 A1* | 12/2019 | Jin | G06F 21/6245 |
| 2020/0034457 A1* | 1/2020 | Brody | H04L 9/0819 |
| 2021/0144006 A1* | 5/2021 | Ma | H04L 9/0643 |
| 2021/0158039 A1* | 5/2021 | Dittmann | G06F 21/78 |
| 2021/0226800 A1* | 7/2021 | Cao | H04L 9/0637 |
| 2022/0141014 A1* | 5/2022 | Britto | H04L 9/3073 |
| | | | 380/286 |
| 2022/0391831 A1* | 12/2022 | Heath | G06F 16/1824 |
| 2023/0087602 A1* | 3/2023 | De Caro | G06Q 20/065 |
| | | | 705/64 |
| 2023/0208640 A1* | 6/2023 | El Khiyaoui | H04L 9/3247 |
| | | | 713/168 |
| 2024/0048386 A1* | 2/2024 | Miyamae | H04L 9/0869 |
| 2024/0095725 A1* | 3/2024 | Dittmann | H04L 9/50 |
| 2025/0062905 A1* | 2/2025 | Miyamae | H04L 9/50 |

FOREIGN PATENT DOCUMENTS

| | | | | |
|---|---|---|---|---|
| CN | 115314277 A | 11/2022 | | |
| CN | 115632784 A | 1/2023 | | |
| WO | WO-2024140259 A1 * | 7/2002 | | G06F 21/62 |

OTHER PUBLICATIONS

Mitani et al, "Traceability in Permissioned Blockchain", Special Section on Security and Privacy in Emerging Decentralized Communication Environments, Jan. 27, 2020, Publisher: IEEE Access.

Sahai et al, "Enabling Privacy and Traceability in Supply Chains using Blockchain and Zero Knowledge Proofs", 2020 IEEE International Conference on Blockchain (Blockchain), Nov. 2, 2020, Publisher: IEEE Xplore.

* cited by examiner

Unable to distinguish messages

BLOCKCHAIN-BASED TRACEABILITY SYSTEM AND METHOD

FIELD OF THE INVENTION

The invention relates to a blockchain-based traceability system and a method enabling, among other things, the splitting and/or merging of traceable items.

BACKGROUND OF THE INVENTION

Blockchain based systems and methods are increasingly being used in supply chains and the like to trace the flow of goods and the components of goods to enable, among other things, product recall when defects are discovered, to identify points of failure where incidents occur, and to give confidence to consumers throughout the supply chain. This has resulted in a rapidly expanding market for traceability solutions in various fields not limited to only goods.

Such traceability solutions are found, for example, in the healthcare related industry to combat counterfeiting of products, to meet regulatory compliance in different jurisdictions, and to protect the brand image of the product manufacturers, suppliers, etc.

Previously, product barcodes, radio frequency identification (RFID) tags, and the like have been employed, for product traceability, but these are not without their own problems and inadequacies.

Blockchain-based traceability systems have been developed which address some of the known issues and which offers benefits such as facilitating the exchange of information amongst parties or entities. IBM Food Trust™ and OriginaTrail™ are two such systems.

One of a number of issues with known blockchain-based traceability systems is that there may be no privacy preserving mechanism such that all entities can know some or all of whom produces a product or component of a product, which entities are linked or integrated with each other, and how much has been produced, supplied, and sold. However, much of this data comprises trade secrets or confidential business information which the owners are reluctant to share.

There is a need for a blockchain-based traceability system and method which provides as many if not all of data confidentiality, data verifiability, identity anonymity, identity unlinkability, support of splitting/merging of traceable items, and traversal of traceability records.

OBJECTS OF THE INVENTION

An object of the present invention is to provide a novel blockchain-based traceability system and method.

Another object of the present invention is to mitigate or obviate to some degree one or more problems associated with known blockchain-based traceability systems and methods.

A further object of the invention is to provide a blockchain-based traceability system and method providing most if not all of data confidentiality, data verifiability, identity anonymity, identity unlinkability, support of splitting/merging of traceable items, and traversal of traceability records.

The above objects are met by the combination of features of the main claims; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a computer implemented method of providing a blockchain based traceability service comprising the steps of: (a) for each secret $s_i$ from a set of secrets S associated with respective ones of a set of parameters for a traceable item, generate a proof $P_i$ to provide a set of proofs P, each parameter of the set of parameters having an identifier $id_i$ from a set of identifiers I; (b) generate a ciphertext C based on a public data encryption key $pk_i$ from a set of public data encryption keys PK associated with respective ones of the set of parameters for the traceable item and information M of said traceable item; (c) repeat step (b) for each pair of identifier and public data encryption key (I, PK); (d) upload to the blockchain the generated ciphertext C, the respective identifier, a hash value of the respective secret, and the respective proof for each parameter of the set of parameters for the traceable item; (e) verify in the blockchain the set of uploaded proofs P; and (f) once the set of proofs P is verified, store verified data in the blockchain.

The verified data comprises the identifier, the hash of the secret, and the ciphertext of the secret for each parameter of the set of parameters for the traceable item.

Preferably, the verified data is stored as a set of the identifiers, the hashes of the secret, and the ciphertexts of the parameters for the traceable item and a set of the identifiers of the parameters for the traceable item.

The traceable item may comprise a product. The parameters of the traceable item may comprise ingredients and/or components used to manufacture the product.

In a second main aspect, the invention provides a system for providing a blockchain based traceability service, the system comprising a memory storing machine-readable instructions and a processor for executing the machine-readable instructions such that, when the processor executes the machine-readable instructions, it configures a computer or server to implement the steps of the first main aspect of the invention.

In a third main aspect, the invention provides a computer implemented method of providing a blockchain based traceability service comprising the steps of, at a first entity in a chain of entities associated with the blockchain, uploading to the blockchain a respective ciphertext C, a respective identifier $id_i$, a hash value of a respective secret $S_i$, and a respective proof $P_i$ for each parameter of a set of parameters for a traceable item, the ciphertext C for each parameter being generated from a set of public data encryption keys PK associated with respective ones of the set of parameters for the traceable item and from information M of said traceable item, then passing the secret $s_i$ for each parameter to a next entity in the chain of entities; said next entity in the chain of entities using the received secret $s_i$ and its own public data encryption key $pk_i$ for each parameter to upload a corresponding ciphertext C, a corresponding identifier $id_i$, a corresponding hash value of the respective secret $S_i$, and a respective proof $P_i$ for each parameter, and then passing its own secret $s_{new}$ for each parameter to a further next entity in the chain of entities.

The step of passing the secret $s_i$ for each parameter to a next entity in the chain of entities is implemented off-chain, i.e., outside of the blockchain.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
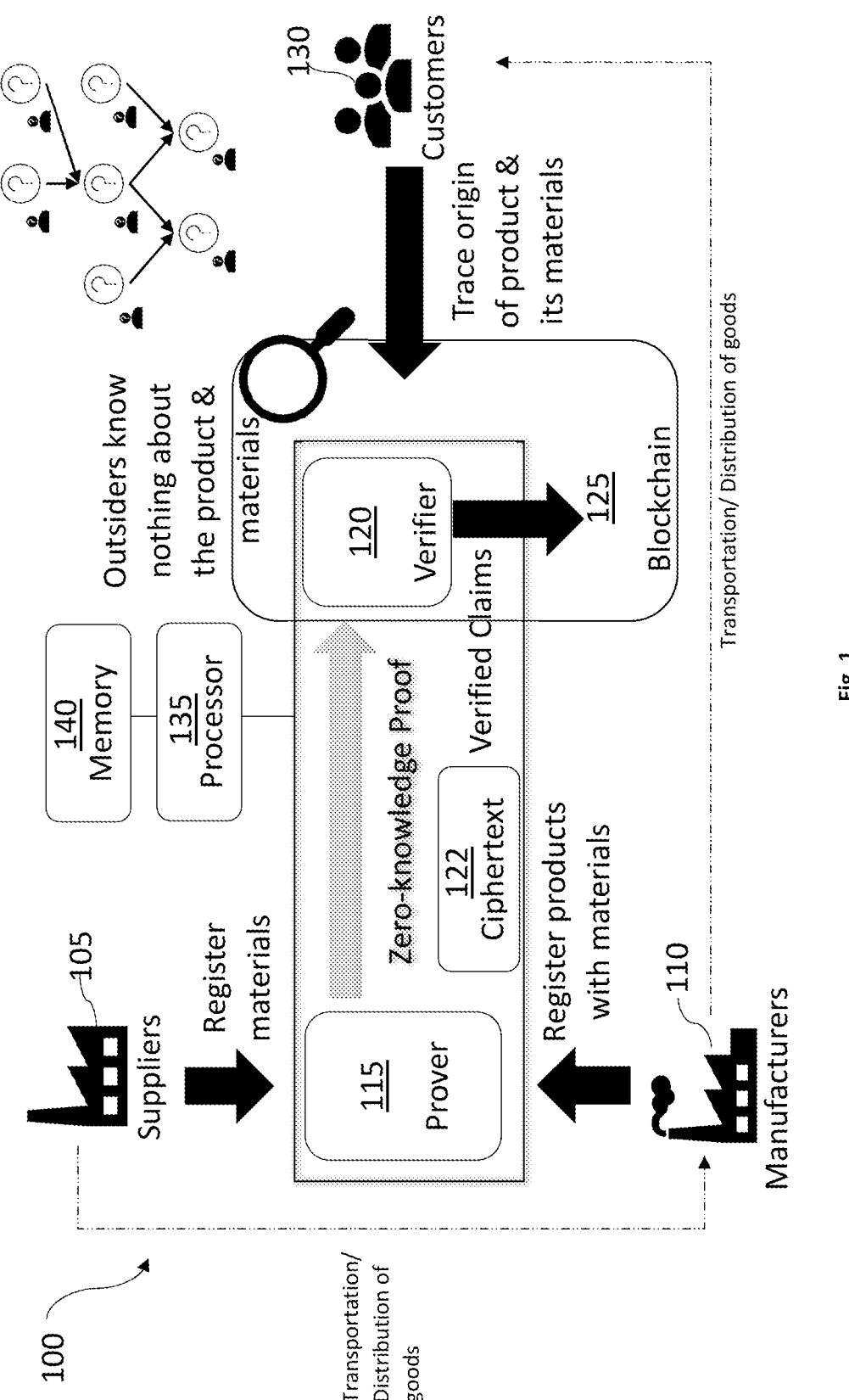
FIG. 1 is a block schematic diagram illustrating one environment in which the system and the method of the invention can be implemented.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the figures, may be implemented in various forms of hardware, software, or combinations thereof. Preferably, these elements are implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode, or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

The present invention provides a protocol or method which defines what type of data may be transmitted, what commands are used to send and receive data, and how data transfers are confirmed to enforce most if not all of data confidentiality, data verifiability, identity anonymity, identity unlinkability, support of splitting/merging of traceable items, and traversal of traceability records.

The invention provides a mindful design of protocol procedures and messages to enable split and merge of traceable items, and traceability record traversal on encrypted data to support various use cases. It also provides careful selection of cryptographic primitives to protect confidentiality and verifiability without breaking anonymity and unlinkability in the application level and also provides one-time identity with easy key management to protect anonymity and unlinkability in the blockchain level.

Referring to FIG. 1, shown is block schematic diagram illustrating one environment in which the system and the method of the invention can be implemented. The example environment of FIG. 1 is a supply chain where traceable items may comprise products and/or components of products. However, it will be understood that the system and the method of the invention can be implemented in any system where traceability of items is required including, but not limited to, financial transactions, contracts, business records, etc.

In the example system 100 of FIG. 1, suppliers 105 register items comprising materials or components of products via the protocol provided by the present invention as will be more fully explained hereinafter. Manufacturers 110 register products comprising one or more of said materials and/or one or more of said components of products also via the protocol. It will understood that the supply chain comprising the suppliers 105 and the manufacturers 110 could also include distributors (not shown) and retailers and the like.

The system 100 includes a prover module 115 which generates proofs based on information associated with said traceable items comprising materials, components of products, and products. The prover module 115 utilizes a zero-knowledge proof scheme to prove the linkage of the traceable items. A verifier module 120 is provided to verify proofs provided by the prover module 115 and, once a proof has been verified, a ciphertext C, a respective identifier, and a hash value of a respective secret are uploaded to the blockchain 125. A ciphertext module 122 is provided in the system 100 for generating the ciphertexts. The zero-knowledge proof scheme proves to the blockchain 125 the relationship of currently registered traceable items without disclosing actual information. This enables customers 130 to trace the origin of materials, components of products and/or products through the blockchain 125 whilst protecting the confidentiality of item information.

The system 100 comprises one or more processors 135 and one or more memories 140.

The prover module 115, the verifier module 120, the ciphertext module 122, and the blockchain 125 may be implemented as software modules on the one or more processors 135 and provisioned by suitable machine-readable instructions stored in the one or more memories 140.

Figure 2:
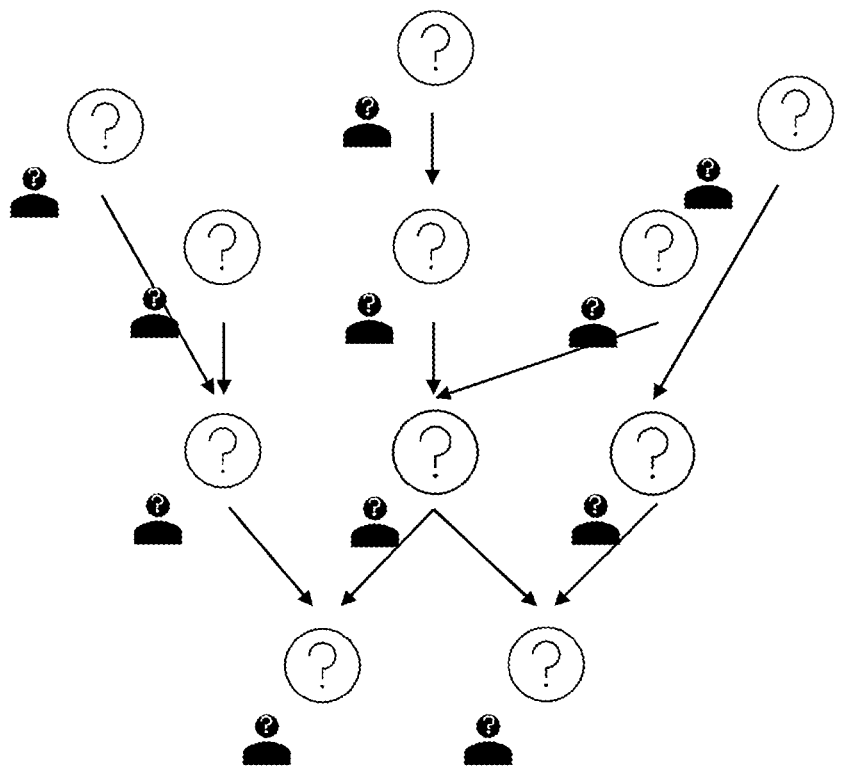
FIG. 2 schematically illustrates the zero-knowledge proof and one-time identity scheme used in the system and method of the invention to mask the identity of the sender.

FIG. 2 schematically illustrates the zero-knowledge proof (zkp) scheme and one time identity used in the system and method of the invention to mask the identity of a sender. This scheme also assist in proving to the blockchain 125 the relationship between registered and other traceable items without disclosing confidential or proprietary information of. In FIG. 2, the zkp establishes (proves) the arrowed relationships. Use of one-time identity, i.e., a new public and private data encryption/decryption key for each transaction masks the sender (supplier/manufacturer, etc.) identity depicted by the question-marks in FIG. 2. Hierarchical deterministic key generation provides for easier key management for the one-time identity.

Figure 3:
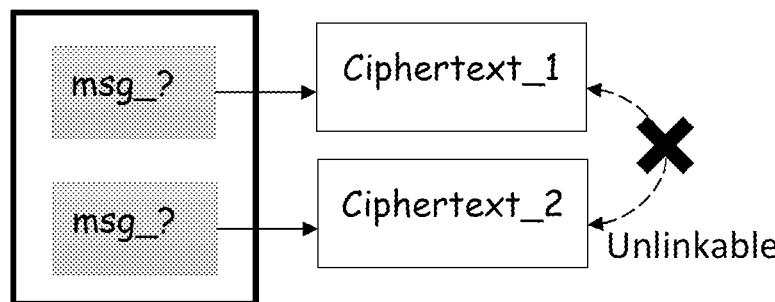
FIG. 3 schematically illustrates that the encryption scheme used in the system and method of the invention involves unlinkability.

FIG. 3 schematically illustrates that the encryption scheme used in the system and method of the invention involves unlinkability in contrast to known systems which link the ciphertexts.

The protocol provided by the invention integrates cryptographic primitives and techniques and models traceability as a directed acyclic graph to enable the splitting/merging of traceable items and to enable the traversal of traceability records.

The protocol comprises a first the step of (a) for each secret $s_i$ from a set of secrets S associated with respective ones of a set of parameters for a traceable item, generate in the prover module 115 a proof $P_i$. This results in a set of proofs P for the set of parameters of the traceable item for the entity making the registration. Preferably, the set of secrets S comprises random secrets $s_i$.

The traceable item may comprise a product. The parameters of the traceable item may comprise ingredients and/or components used to manufacture the product. In some embodiments, the ingredients and/or components also comprise traceable items.

The protocol involves the step of (b) generating in a ciphertext module 122 of the system 100a ciphertext C based on a public data encryption key $pk_i$ from a set of public data encryption keys PK associated with respective ones of the set of parameters for the traceable item and information M of said traceable item. In a step (c), the preceding step (b) is repeated for each pair of identifier and public data encryption key (I, PK). The protocol includes step (d) uploading to the blockchain the generated ciphertext C, the respective identifier, a hash value of the respective secret, and the respective proof for each parameter of the set of parameters for the traceable item. In step (e) of the protocol, the set of proofs P associated with the uploaded data for the set of parameters of the traceable item set of is verified by the verifier module 120 and, in step (f), once the proofs P is verified, the uploaded data is stored in the blockchain.

The verified data comprises the identifier, the hash of the secret, and the ciphertext of the secret for each parameter of the set of parameters for the traceable item.

Preferably, the verified data is stored as a set of the identifiers, the hashes of the secret, and the ciphertexts of the parameters for the traceable item, and as a separate set of the identifiers of the parameters for the traceable item.

The pseudocode for implementing the protocol comprises the following data inputs:

$S=\{s_0, \ldots s_n\}$ where S=set of random secrets associated with a traceable item and $s_i$ is a random secret associated with a parameter i of the traceable item;

$I=\{id_0, \ldots id_n\}$ where I=set of identifiers of the parameters of the traceable item;

$PK=\{k_0, \ldots k_n\}$ where K=set of public keys for the parameters of the traceable item and $pk_i$ is a public data encryption key associated with parameter i of the traceable item;

M comprises information relating to or associated with the traceable item.

The algorithm implementing the protocol comprises:

```
id_new,s_new ∈_R ℤ
pk_new,sk_new ← some key pair generation function
For each s_i ∈ S,
    P = P ∪ ProofGenerate(s_i)
C = Enc(PK ∪ {pk_new},M)
Upload id_new,C,H(s_new),{{id_i,P_i} for each in I,P} to blockchain
Once P is verified, blockchain stores {id_new,C,H(s_new)}
and {id_0, ... , id_n}→ id_new
```

The protocol includes generating a new identifier $id_{new}$ for a new parameter of the traceable item and generating a new secret $s_{new}$ for said new parameter. Step (d) of the protocol preferably comprises, for each pair of identifier and proof (I, P), uploading to the blockchain the new identifier $id_{new}$, a hash value of the new secret $s_{new}$, the corresponding ciphertext C, and the corresponding proof.

In one embodiment, the protocol involves, for each entity in a chain, passing that entity's secret for each parameter of the traceable item to a next entity in the chain. This is illustrated by FIG. 4.

Figure 4:
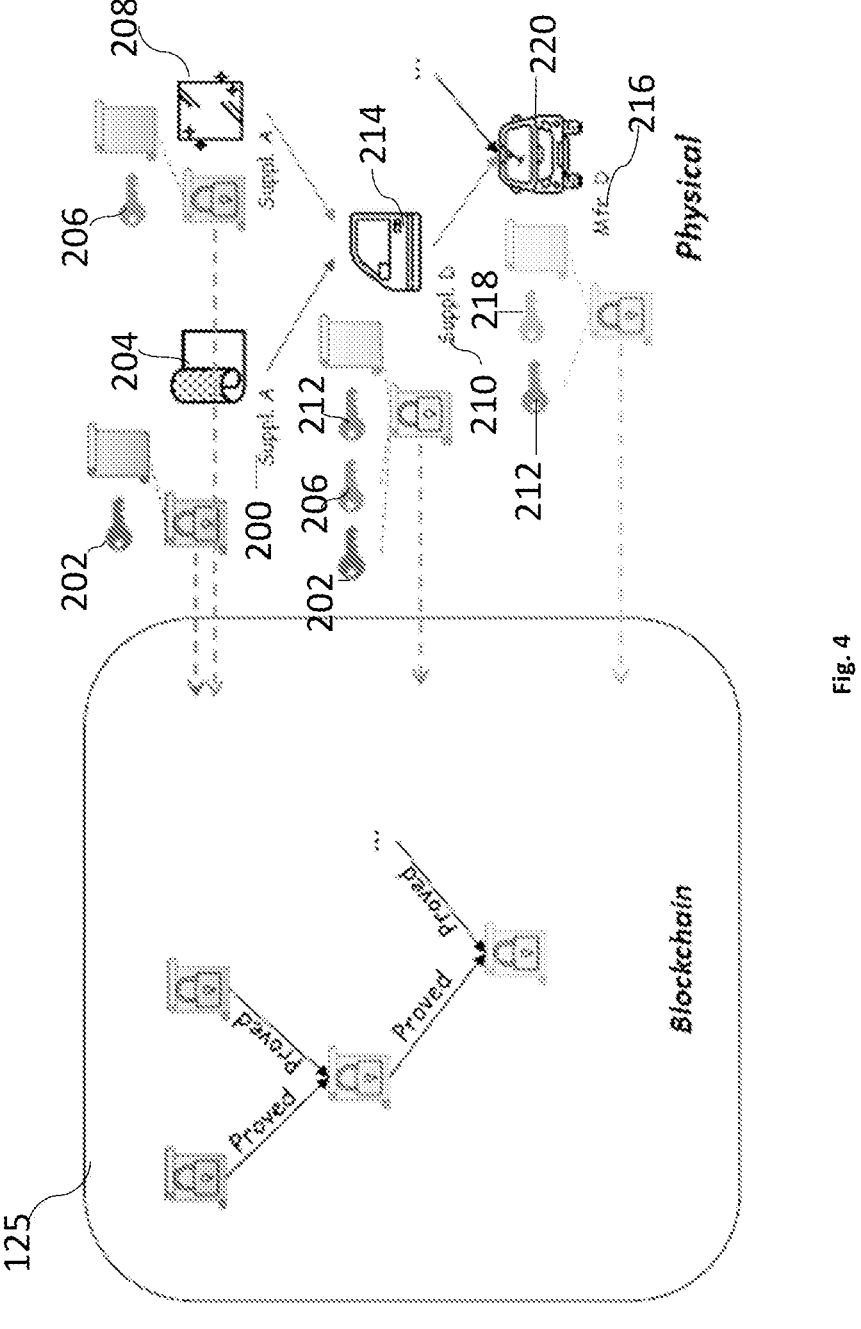
FIG. 4 schematically illustrates the method of registering entities in the blockchain.

In FIG. 4, it can be seen that supplier S ("Suppl. A") 200 registers a record encrypted by public key 202 with the blockchain 125 for traceable item 204 and also registers a record encrypted by public key 206 with the blockchain 125 for traceable item 208. Suppl. A 200 then passes both key 202 and key 206 downstream to supplier D ("Suppl. D") 210. Suppl. D 210 has its own public key 212 as well as passed down public keys 202 and 206. Suppl. D 210 uses its own public key 212 and the passed down public keys 202, 206 to register a record encrypted by said public keys 202, 206, 214 with the blockchain 125 for traceable item 214. Then, Suppl. D 210 passes its public key 212 to manufacturer D ("Mfr. D") 216. Mfr. D 216 has its own public key 218. Mfr. D 216 uses its own public key 218 and passed down public key 214 to register a record encrypted by said public keys 214, 218 with the blockchain 125 for traceable item 220. The step of passing down a public key or keys from one entity in the chain of entities is conducted off-chain, i.e., conducted outside the blockchain 125.

It will be understood that the number of public keys being passed down from one entity in the chain of entities to another entity lower in the chain of entities relates to the number of parameters of the traceable item or items and therefore the number of public keys possessed by an entity immediately above the lower entity in the chain of entities and how many entities a lower entity is directly linked to from above in the chain of entities.

Figure 5:
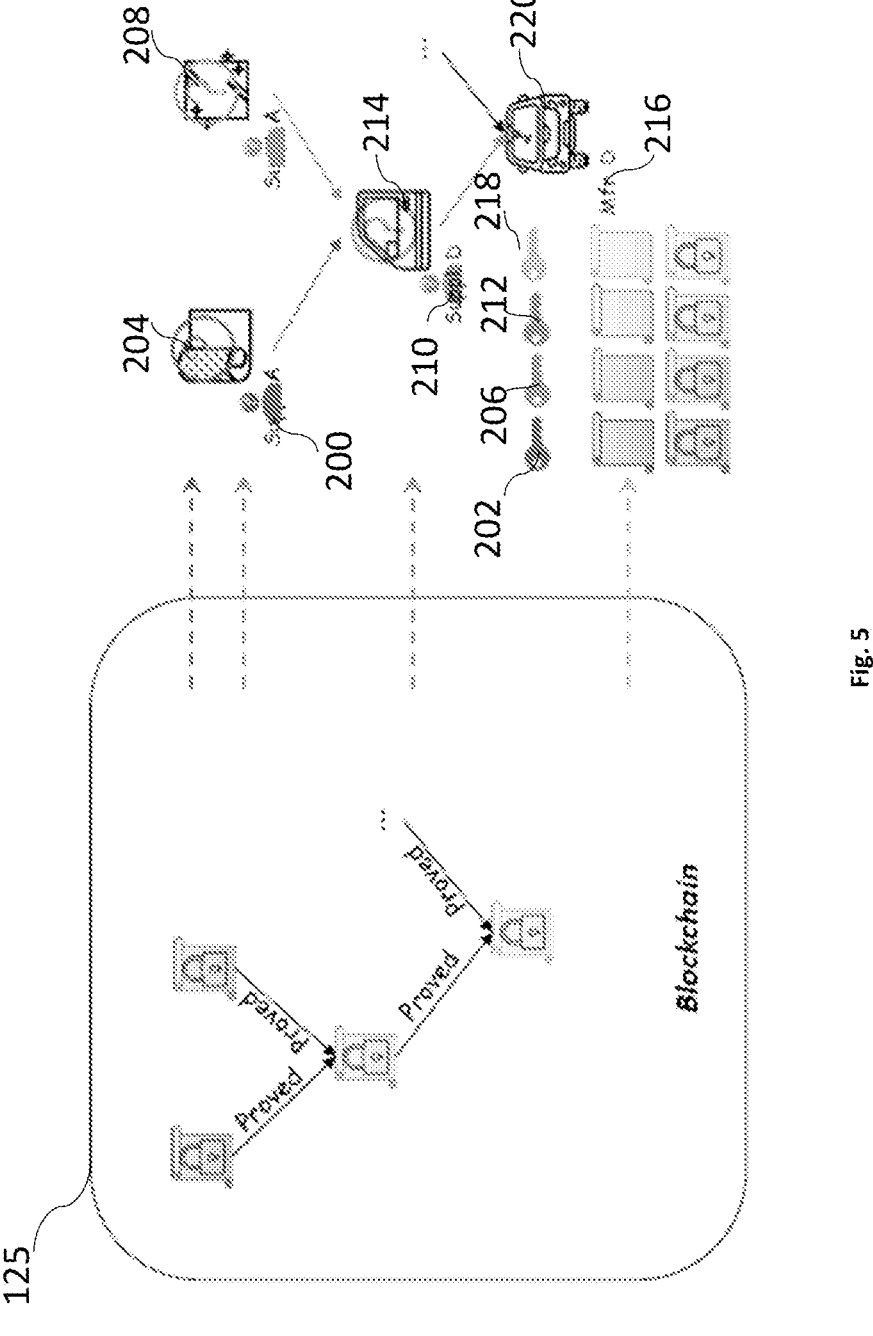
FIG. 5 schematically illustrates the method of traversal of traceability records through the blockchain.

FIG. 5 schematically illustrates how entities traverse traceability records through the blockchain 125. In this example, it will be seen that Suppl. A 200 uses its private keys corresponding to public keys 202, 206 to decrypt retrieved encrypted data from the blockchain 125 for traceable items 204, 208, 214, 220. Suppl. A 200 is thereby enabled to decrypt all successors of its traceable items 204, 208. Suppl. D 210 uses its own private key corresponding to public key 212 to decrypt retrieved encrypted data from the blockchain 125 for traceable items 214, 220. In the case of. Mfr. D 216, it uses its own private key corresponding to public key 218 and the private keys corresponding to higher entity public keys 202, 206, 212 to decrypt retrieved encrypted data from the blockchain 125 for traceable items 204, 208, 214 and 220.

Each entity in the chain of entities is able to retrieve encrypted data from the blockchain and decrypt said encrypted data using all of the public data encryption keys and corresponding private data decryption keys generated by itself and other entities above it in the chain.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A computer implemented method of tracing an origin of a product in a supply chain using a blockchain based traceability service comprising the steps of:

(a) for each secret $s_i$ from a set of secrets S associated with respective ones of a set of parameters for a traceable item comprising the product, said parameters comprising any one or any combination of materials, ingredients, and components for manufacturing said product, generating a proof $P_i$ to provide a set of proofs P, each parameter of the set of parameters having an identifier $id_i$ from a set of identifiers I;

(b) generating a ciphertext C based on a public data encryption key $pk_i$ from a set of public data encryption keys PK associated with respective ones of the set of parameters for the traceable item and information M of said traceable item comprising confidential or proprietary information related to or associated with the product;

(c) repeating step (b) for each pair of identifier and public data encryption key (I, PK);

(d) uploading to the blockchain the generated ciphertext C, the respective identifier, a hash value of the respective secret, and the respective proof for each parameter of the set of parameters for the traceable item;

(e) verifying in the blockchain the set of proofs P; and (f) once the set of proofs P is verified, storing verified data in the blockchain;

(g) retrieving by an entity in a chain of entities associated with the blockchain encrypted data from the blockchain and decrypting said encrypted data using all corresponding private data decryption keys SK to the public data encryption keys PK associated with itself and other entities above it in the chain of entities to thereby trace the origin of the product without said entity being able to access the confidential or proprietary information M related to or associated with the product.

2. The method of claim 1, wherein each secret $s_i$ in the set of secrets S associated with respective ones of the set of parameters for the traceable item comprises a random secret.

3. The method of claim 1, wherein the method includes generating a new identifier $id_{new}$ for a new parameter of the traceable item.

4. The method of claim 3, wherein the method includes generating a new secret $s_{new}$ for the new parameter of the traceable item.

5. The method of claim 4, wherein step (d) of the method comprises, for each pair of new identifier and proof (I, P), uploading to the blockchain the new identifier $id_{new}$, a hash value of the new secret $s_{new}$, the corresponding ciphertext C, and the corresponding proof.

6. The method of claim 5, wherein, for each entity in a chain, after uploading to the blockchain the new identifier $id_{new}$, the hash value of the new secret $s_{new}$, the corresponding ciphertext C, and the corresponding proof for each parameter of the set of parameters of the traceable item, passing the new secret $s_{new}$ for each parameter to a next entity in the chain of entities, wherein the step of passing is implemented outside of the blockchain.

7. The method of claim 6, wherein the next entity in the chain of entities repeats step (d) using the received secret $s_{new}$ and its own public data encryption key $pk_i$, to generates a new secret $s_{new}$ for each parameter and passes the new secret $s_{new}$ for each parameter to a further next entity in the chain of entities.

8. The method of claim 7, wherein an entity in the chain of entities retrieves encrypted data from the blockchain and decrypts said encrypted data using all corresponding private data decryption keys SK to the public data encryption keys PK associated with itself and other entities above it in the chain of entities.

9. The method of claim 1, wherein the proof comprises a zero-knowledge proof.

10. A system for tracing an origin of a product in a supply chain using a blockchain based traceability service, the system comprising:

a memory storing machine-readable instructions; and a processor for executing the machine-readable instructions such that, when the processor executes the machine-readable instructions, it configures a computer or server to implement the steps of:

(a) for each secret $s_i$ from a set of secrets S associated with respective ones of a set of parameters for a traceable item comprising the product, said parameters comprising any one or any combination of materials, ingredients, and components for manufacturing said product, generating a proof $P_i$ to provide a set of proofs P, each parameter of the set of parameters having an identifier $id_i$ from a set of identifiers I;

(b) generating a ciphertext C based on a public data encryption key $pk_i$ from a set of public data encryption keys PK associated with respective ones of the set of parameters for the traceable item and information M of said traceable item comprising confidential or proprietary information related to or associated with the product;

(c) repeating step (b) for each pair of identifier and public data encryption key (I, PK);

(d) uploading to the blockchain the generated ciphertext C, the respective identifier, a hash value of the respective secret, and the respective proof for each parameter of the set of parameters for the traceable item;

(e) verifying in the blockchain the set of proofs P; and (f) once the set of proofs P is verified, storing verified data in the blockchain;

(g) retrieving by an entity in a chain of entities associated with the blockchain encrypted data from the blockchain and decrypting said encrypted data using all corresponding private data decryption keys SK to the public data encryption keys PK associated with itself and other entities above it in the chain of entities to thereby trace the origin of the product without said entity being able to access the confidential or proprietary information M related to or associated with the product.

11. A computer implemented method of tracing an origin of a product in a supply chain using a blockchain based traceability service comprising the steps of:

at a first entity in a chain of entities associated with the blockchain, uploading to the blockchain a respective ciphertext C, a respective identifier $id_i$, a hash value of a respective secret $S_i$ and a respective proof $P_i$ for each parameter of a set of parameters for a traceable item comprising the product, said parameters comprising any one or any combination of materials, ingredients, and components for manufacturing said product, the ciphertext C for each parameter being generated from a set of public data encryption keys PK associated with respective ones of the set of parameters for the traceable item and from information M of said traceable item comprising confidential or proprietary information related to or associated with the product, then passing the secret $s_i$ for each parameter to a next entity in the chain of entities;

said next entity in the chain of entities using the received secret $s_i$ and its own public data encryption key $pk_i$ for each parameter to upload a corresponding ciphertext C, a corresponding identifier $id_i$, a corresponding hash value of the respective secret $S_i$ and a respective proof $P_i$ for each parameter, and then passing its own secret $s_{new}$ for each parameter to a further next entity in the chain of entities; and an entity in the chain of entities retrieving encrypted data from the blockchain and decrypting said encrypted data using all corresponding private data decryption keys SK to the public data encryption keys PK associated with itself and other entities above it in the chain of entities to thereby trace the origin of the product without said entity being able to access the confidential or proprietary information M related to or associated with the product.

12. The method of claim 11, wherein the corresponding proofs comprise zero-knowledge proofs.

* * * * *